July 17, 1962 P. E. KEYSER 3,044,472
SMOKERS' PIPES
Filed Oct. 17, 1958
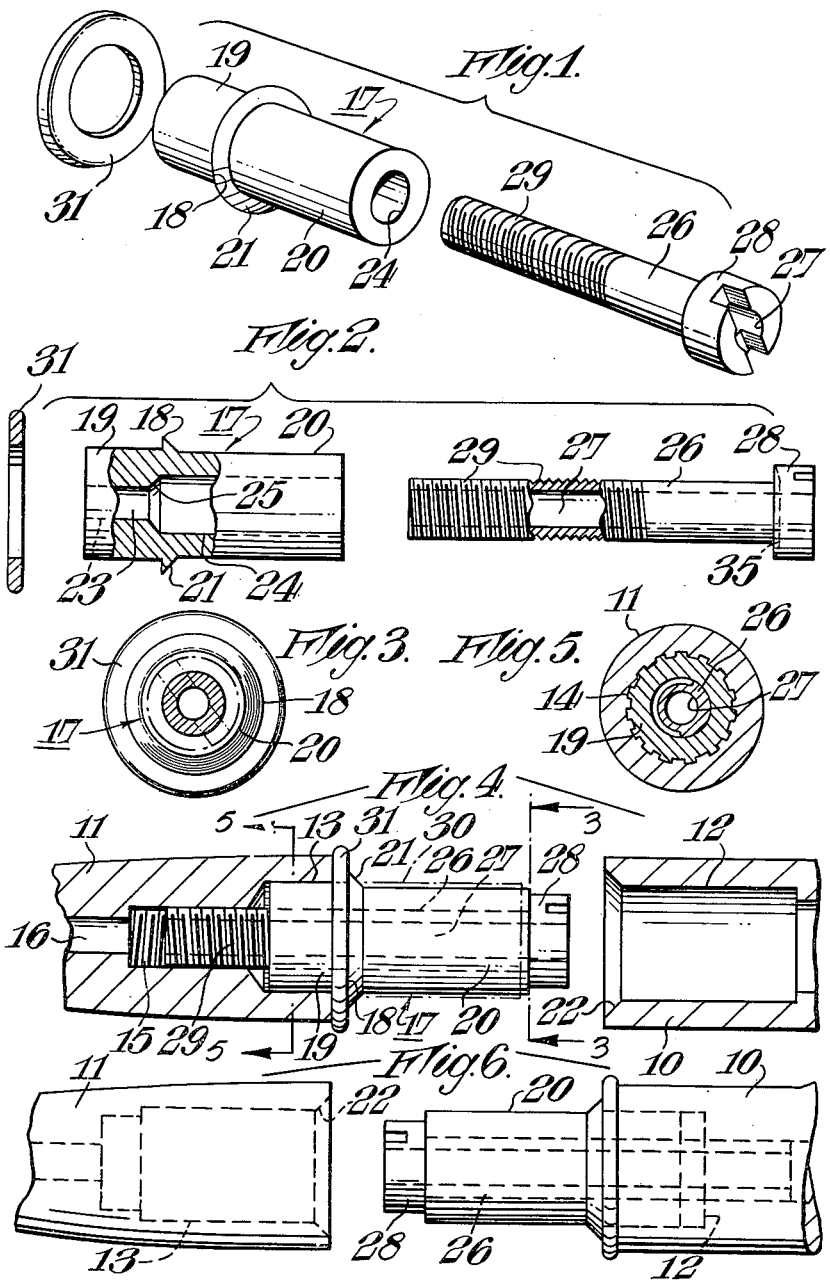
Inventor
Peter E. Keyser
By Ralph B. Stewart
Attorney

United States Patent Office 3,044,472
Patented July 17, 1962

3,044,472
SMOKERS' PIPES
Peter E. Keyser, 2 Norfolk Terrace, Brighton, England
Filed Oct. 17, 1958, Ser. No. 767,893
Claims priority, application Great Britain Oct. 29, 1957
2 Claims. (Cl. 131—225)

This invention concerns smokers' pipes and relates to a device for attaching the mouthpiece of the pipe to the stem of the bowl.

When manufacturing smokers' pipes, and when repairing the pipe as a result of breakage to the mouthpiece, satisfactory fitting of the mouth piece to the bowl stem has required a certain amount of hand working. The object of the present invention is to reduce or eliminate this requirement so that when replacing a mouthpiece because of breakage this may readily be done by the pipe owner and when manufacturing smokers' pipes the mouthpiece may be easily fitted to the bowl stem by the manufacturer without the necessity of hand working.

In the present invention the mouthpiece is secured to the bowl stem by means of a tubular member of rubber-like material secured to one of said two parts to be attached against rotation relatively thereto in combination with means carried by the part to which the tubular member is secured and adjustable axially of the tubular member for increasing its diametrical size to fit sockets in or associated with the other of the two parts to be attached.

By a rubber-like material is to be understood a material which is sufficiently rigid to form an effective connection between the mouthpiece and the bowl stem and which can relatively easily have its shape changed. Thus, the material may be a relatively hard natural rubber or polyvinylchloride or polythene although other substances could be used.

The adjustable means may comprise a hollow pin which passes through the tubular member and is screw-threaded into the mouthpiece or into the bowl stem, the pin having either a head to engage one end of the tubular member or being a tapering fit in the tubular member. With the headed pin, axial adjustment will contract the tubular member lengthwise thereby to increase its diametral size.

In the preferred device the tubular member has an axial hole of circular shape which is stepped in diameter between its ends, the larger section of the hole affording a clearance for the shank of the pin that carries the head, and the smaller section of the hole being somewhat smaller than the screwed other end of the pin, whereby scewing of the pin into the smaller section of the hole produces a radial expansion of the surrounding rubber-like material.

Various forms of the invention are illustrated by way of example in the accompanying drawings, in which:

FIG. 1 is a perspective view of the parts of a connector device,

FIG. 2 is a side elevation of the parts shown in FIG. 1, partly sectioned,

FIG. 3 is an end view of the tubular member of the device, looking in the direction 3—3 of FIG. 4, FIG. 4 is a sectional view showing the connector device fitted to a mouthpiece ready for attachment to the pipe stem, FIG. 5 is a section on the line 5—5 of FIG. 4, FIG. 6 is a side elevation of an alternative arrangement showing the device fitted to a pipe stem.

The same reference numerals are used for like parts in the various views.

Referring first to FIGS. 1 to 5, both the pipe-stem 10 and the mouthpiece 11 of the pipe are formed with cylindrical sockets 12, 13 respectively. The circular wall of the mouthpiece socket is formed with serrations in the form of shallow longitudinal grooves 14 (FIG. 5) and a screw-threaded hole 15 extends axially of the mouthpiece from the end face of the socket into the smoke duct 16.

The mouthpiece and the pipe-stem are connected by means of the connector device shown in FIG. 1. This comprises a rubber-like tubular member 17 which is made of any of the materials earlier described. Except for an intermediate circular flange 18, the tubular member 17 is of uniform external diameter, such that its end portions 19 and 20 at opposite sides of the flange can be engaged into the sockets of the mouthpiece and pipe-stem. The flange 18 is chamfered at one side 21 to fit in the usual flared opening 22 of the pipe-stem socket 12.

The tubular member 17 is formed with an axially disposed plain walled hole with two diameters 23, 24 separated by a shoulder 25 positioned at the junction of the mouthpiece and pipe-stem in the assembled pipe. The shorter end portion 19 with the smaller diameter hole 23 is intended to be engaged into the mouthpiece socket 13.

For fitting and adjusting the tubular member, there is a tubular pin 26 having an axial hole 27 that serves as a smoke duct. One end of the pin has an integral head 28 with a slot for a screwdriver or coin. The pin shank is externally threaded at 29 for the major part of its length to screw into the smaller diameter hole 23 of the tubular member and into the axial hole 15 of the mouthpiece.

In assembling the pipe the end portion 19 of the tubular member with the smaller hole is first pushed into the mouthpiece socket 13. The pin 26 is introduced into the tubular member through its other end and pushed along the hole 24, which just affords a clearance. The pin is then screwed into the smaller plain walled hole 23 of the tubular member. This operation expands the end portion 19 of the tubular member and forces it into gripping contact with the fluted wall 14 of the mouthpiece socket. Thereafter the pin is screwed into threaded hole 15 of the mouthpiece.

The projecting other end portion 20 of the tubular member is then adjusted in diameter by further screwing the pin 26 into the mouthpiece until the end portion 20 becomes a tight push fit in the pipe-stem socket 12, such that the mouthpiece is firmly held in place and yet can be withdrawn in the normal way, as for cleaning of the pipe. The action of thus screwing in the pin causes a lengthwise contraction by the pin head 28 of the projecting end portion of the tubular member, with a consequent radial expansion of the tube wall as shown in dotted lines at 30 in FIG. 4, to provide a good push fit in the pipe-stem socket.

A spacer ring or washer 31, of metal or other suitable material, is fitted on the tubular member so as to lie between the plane face of the flange 18 and the mouthpiece. The ring or washer is dimensioned to project a little beyond the surface of the pipe-stem, so as to hide any small discrepancies in diameter between the adjacent ends of the mouthpiece and pipe stem and thereby obviate the necessity of hand-working the stem and mouthpiece to ensure that the surfaces are flush.

In the modification shown in FIG. 6 the shorter end portion 19 of the tubular member with the smaller hole is fitted into and made a fixture with the pipe-stem 10, the pin 26 being threaded into the smoke bore of the pipe-stem.

In FIGS. 1 to 5 the end portions 19 and 20 of the tubular members 17 are shown as being of the same diameter. In practice tubular members will normally be made in a range of sizes, with the longer end portions 20 of various diameters, so as to fit different sizes of sockets, but the shorter end 19 will be made of standard size for the range.

An appropriate tubular member may be selected loosely to fit the bowl stem and this member is secured to the selected mouthpiece. The diametral size of the long portion 20 of the tubular member is then adjusted so that it is an accurate fit in the socket in the stem of the bowl. In this way it is ensured that a mouthpiece can be fitted to the bowl without hand work and this may be done by the owner of the pipe if a broken mouthpiece is to be replaced or by the manufacturer.

As shown in FIG. 2, the head 28 has a dished undersurface at 35 to prevent the end of the tubular member from spreading out.

The present invention enables a small range of mouthpieces to be manufactured the diameters of which correspond approximately with the diameters of the bowl stems which are commonly made. The socket in the mouthpiece is of standard size for the range. Accordingly it is possible to select from the range of mouthpieces one which is nearest in diametral size to the stem to which it is to be fitted. The spacer rings are also made in a range of outside diameters so that one may be selected which is slightly larger than the diameter of the stem to which it is to be fitted. A set of tubular members is provided all of which have the end portion which is to be fitted to the mouthpiece of the same diameter, the diameters of the other end portions of the members being different to suit the different hole diameters of a range of bowl stems. The tubular member of largest diameter is selected which loosely fits the bowl stem and this member is secured to the selected mouthpiece. The diametral size of the projecting cylindrical part of the tubular member is then adjusted by pin 26 so that it is an accurate fit in the hole in the stem of the bowl. When the tubular member has been fitted to the stem as just described, the tubular member cannot be adjusted in size, while so fitted, upon rotation of the mouthpiece relatively to the stem. In this way the mouthpiece can be fitted to the bowl without hand work and this may be done by the owner of the pipe if a broken mouthpiece is to be replaced or by the manufacturer.

The invention includes within its scope mouthpieces per se as set forth above and tubular members as set forth above as well as an assembly comprising a tubular member and a mouthpiece.

It may be an advantage in certain circumstances gently to heat the tubular member before adjusting the pin to increase the diametral size of the member when the member is thermoplastic and, at normal temperatures, is incapable or difficult to adjust as to size. Reference to adjustment of the diametrical size of the tubular member is to be understood as including warming the member for such adjustment to be effective.

I claim:

1. A smoker's pipe comprising in combination: a mouthpiece part; a bowl stem part, each of said parts having a joint end; and a device for joining said parts, one of said parts having a socket in the joint end thereof and the other of said parts having a cylindrical bore in the joint end thereof, said one part also having a threaded bore adjacent to said socket and coaxial therewith, said device comprising a resilient tubular member having one end insertable into said socket and the other end into said cylindrical bore, a hollow pin extending through said tubular member, said hollow pin having a head at one end, being threaded at its other end and receivable in said threaded bore whereby rotation and corresponding axial adjustment of said pin and the head thereon operates to vary the diametrical size of said other end of said resilient tubular member, and said resilient member being formed with an axial hole of circular cross-section in said one end, said hole being smaller than the threaded end of said pin to produce radial expansion of said one end on threading said pin through the hole and into said threaded bore for securing said one end of said tubular member against rotation in said socket.

2. The apparatus recited in claim 1, wherein said socket is a splined cylindrical socket.

References Cited in the file of this patent
UNITED STATES PATENTS

| | | |
|---|---|---|
| Re. 21,209 | Lavietes | Sept. 19, 1939 |
| 61,283 | Truman | Jan. 15, 1867 |
| 1,796,308 | Shull | Mar. 17, 1931 |
| 2,317,180 | Daignault et al. | Apr. 20, 1943 |
| 2,451,838 | Lavietes | Oct. 19, 1948 |
| 2,452,184 | Cole | Oct. 26, 1948 |
| 2,613,675 | Darbee | Oct. 14, 1952 |
| 2,721,089 | Shames | Oct. 18, 1955 |

FOREIGN PATENTS

| | | |
|---|---|---|
| 584,501 | France | Nov. 24, 1924 |